Figure 1:
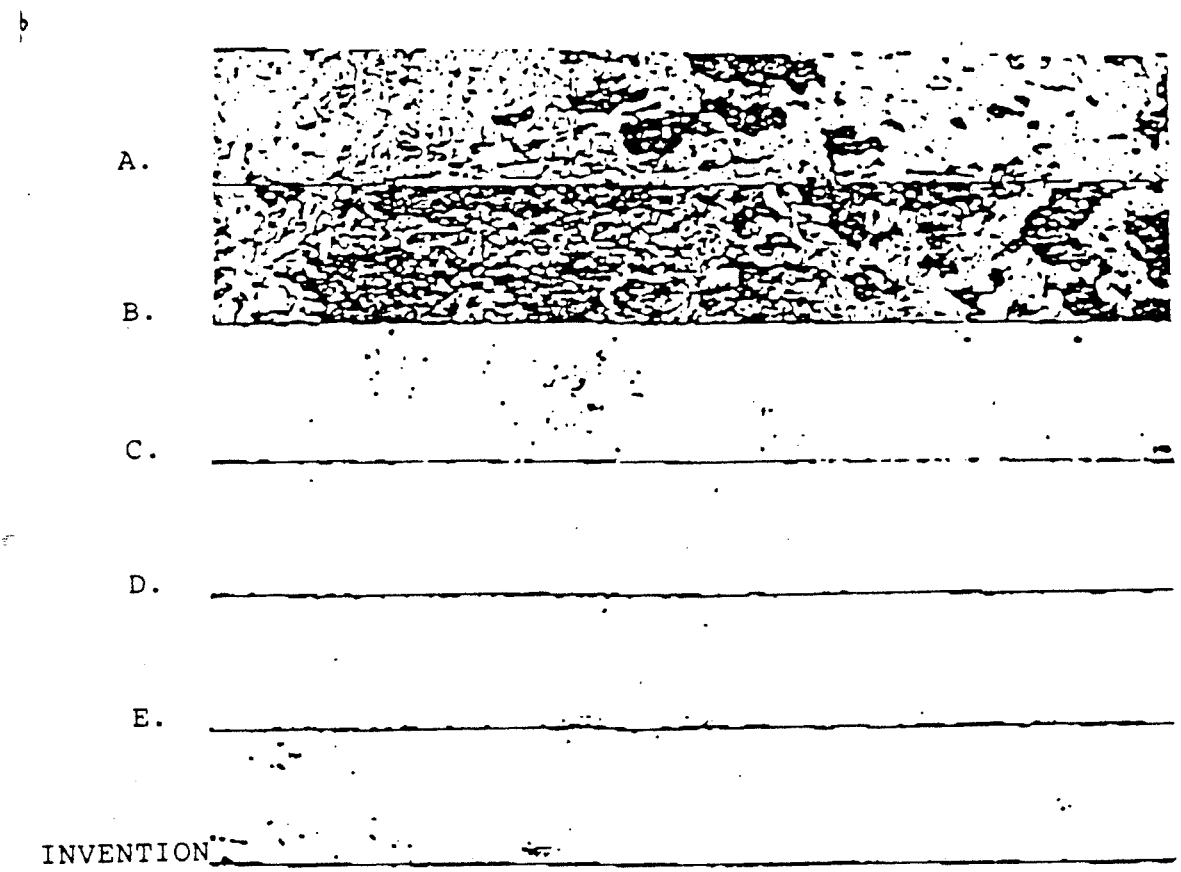

United States Patent [19]

Säverin et al.

[11] Patent Number: 5,045,394
[45] Date of Patent: Sep. 3, 1991

[54] WRITEABLE PHOTOGRAPHIC SUPPORT MATERIALS

[75] Inventors: Eckehard Säverin, Osnabrück; Hans-Udo Tyrakowski, Hasbergen, both of Fed. Rep. of Germany

[73] Assignee: Felix Schoeller jr. GmbH & Co. KG, Osnabruck, Fed. Rep. of Germany

[21] Appl. No.: 260,737

[22] Filed: Oct. 21, 1988

[30] Foreign Application Priority Data

Oct. 23, 1987 [DE] Fed. Rep. of Germany ....... 3735871

[51] Int. Cl.⁵ .............................................. B32B 5/16
[52] U.S. Cl. ................... 428/402; 428/519; 428/520; 430/527; 430/531; 430/950
[58] Field of Search .............. 428/511, 516, 520; 430/527, 531, 950

[56] References Cited

U.S. PATENT DOCUMENTS

| 4,265,977 | 5/1981 | Kawamura et al. | 428/511 |
| 4,370,389 | 1/1983 | Ogura et al. | 428/511 |
| 4,614,688 | 9/1986 | Tamagawa et al. | 428/320 |
| 4,654,261 | 3/1987 | Takayanagi et al. | 428/520 |

FOREIGN PATENT DOCUMENTS 3700183  7/1988  Fed. Rep. of Germany .

Primary Examiner—Edith L. Buffalow
Attorney, Agent, or Firm—Lockwood, Alex, FitzGibbon & Cummings

[57] ABSTRACT

A photographic support material is disclosed for light sensitive coatings in the form of a plastic coated paper or a plastic foil whose backside has a coating allowing writability. The back coating comprises a terpolymer latex of styrene-butadiene-methacrylate, a hard silicic acid, and an aluminium modified colloidal silicic acid sol. The coating may also include an aqueous solution of a salt of an organic polyacid. The quantities of the additives used result in optimal characteristics of printability, writability using various pens and lead pencils, minimal soiling in old developing baths, minimal coloring in developing solutions, good tape adhesion and, when required, good antistatic characteristics.

12 Claims, 1 Drawing Sheet

WRITEABLE PHOTOGRAPHIC SUPPORT MATERIALS

DESCRIPTION OF INVENTION

The invention relates to a photographic support material for light sensitive coatings in the form of either a plastic coated paper or a plastic foil having a printable and a writable backside coating, and to an aqueous coating mix for the manufacture of this backside coating.

In contrast to earlier times when barita coated photographic papers were common, more recently papers have been introduced as support materials for light sensitive coatings, and especially for light sensitive coatings for color photography, which have their front and backside surfaces coated with polyolefins. The polyolefin coating is preferably polyethylene which is extruded onto the paper surfaces using a flat sheeting die. Such a photographic support is described, e.g. in German Patent No. DE-PS 23 44 367.

Plastic foils or papers coated with synthetic resins allow shorter processing times. However, undesirable characteristics are experienced during manufacturing or processing and measures must be taken to compensate or suppress these disadvantages.

A further necessity is that the backside of the exposed photographic material still to be developed may need to be marked, written upon or otherwise identified as belonging to particular customers. However, a thermoplastic foil or hydrophobic sealing coating on a basis paper as such, is not writable or markable. Special means and measures are necessary to obtain the printability or writability needed during automatic continuous processing of the photographic sheet material. Corresponding suggestions for the solution of these problems can be found in the European Patent Application No. 0 160 912 and in German DE-OS 3346258.

It is furthermore necessary that the coated photographic material, when passed through the different baths (such as developing or fixing baths) does not attract any dirt particles to its surface which may have formed in the photographic baths as a result of oxidation or condensation reactions (see European Patent Application No. EP 0 160 912). Similarly, a coloring or staining of the backside as a result of oxidized developer or washed out sensitizing dye is undesirable.

On the other hand a disadvantageous influence on the developing solutions or baths, caused by the additive used to improve writability or printability is to be avoided. This means that these auxiliary coatings must be resistant to the photographic baths.

The final necessity is that these basis materials, resistant to photographic solutions, should offer a surface capable of good tape adhesion. Adhesive tapes are used to fix together strips of photographic paper to enable the smooth movement of same through developing machines.

Furthermore, in many cases electrostatic charging of the hydrophobic photographic support material should be prevented. Electrostatic charges can be created as the base material, consisting of or coated with plastics, is unwound and fed through an emulsion coating machine and thereafter during removal from the stack. This static electricity, upon reaching a certain value as a whole, or at certain areas in the processing line, may discharge in various ways causing exposure for fogging of the light sensitive emulsion, thus making the material unusable.

All these requirements are known and various solutions to the problem of meeting them have been described. They usually take the form of complex coatings consisting only rarely of less than three components. However, it has been difficult to date to meet all of these requirements because the solution to one particular difficulty was often contradictory to the solution of another.

It can be seen from the European Patent Application No. 0 160 912 that such a polyethylene coated photographic material has been provided on its backside with an antistatic coating consisting of a sodium magnesium silicate, a sodium polystyrene sulfonate and certain succinic acid semiesters. This coating is to prevent static build up and also to protect the material against dirt particles. However, it is exactly this coating which offers bad adhesion to tapes and poor printability.

DE-OS 33 46 258 describes a coating consisting of a binding agent and a crystalline silica. This coating exhibits no antistatic properties and tends to pick up dirt particles in the baths. Both characteristics, as well as the adhesion of tapes, are not examined within the frame of the DE-OS 33 46 258. This coating is not suitable for adhesion of tapes.

Hydrophobic components have the common disadvantages of high dirt particle attraction, low antistatic effectivity and poor writability, especially for lead pencil. In contrast, hydrophilic components offer poor tape adhesion and printability and swell or disintegrate in photographic baths.

Even if in certain cases it is possible to dispense with good antistatic properties (as there are other ways and means of overcoming the difficulty of electrostatic discharges in photographic coatings) the basic requirements of a usable backside coating for photographic base material are and remain:
   printability by variously colored inking ribbons;
   writability by various pens and pencils;
   satisfactory adhesion of tapes;
   lowest possible dirt particle and sludge attraction in photographic baths; and
   no staining or coloring during processing.

German Patent Application No. 37 00 183 thoroughly describes the difficulties. It suggests a further solution which offers a useful and practical compromise with respect to all of the requirements, except for writability by pencil. Moreover, dirt and sludge attraction is at a level which is not completely satisfactory in some photographic baths, especially when the bath liquids are old. This could be a result of various manufacturers using differing chemicals. Therefore, the solution described in DE-OS 37 00 183, although suitable for certain developing systems already on the market, is still unsuitable in other systems also on the market (usually of Japanese manufacture) because medium to heavy staining, usually referred to as "tar stain", can be observed.

It is therefore an object of the present invention to provide a backside coating for a photographic support material as described heretofore which optimally meets the requirements described, namely printability with inking ribbons already on the market, writability by lead pencil as well as other writing utensils, low dirt and sludge attraction in all the usual developing solutions on the market, absence of negative affects to the developing baths caused by particles or components being washed out of the coating, good tape adhesion during the development processes, absence of coloring or staining caused by the developer, as well as sufficient antistatic properties.

It is a particular object of the invention to provide a backside coating which, while retaining its positive properties regarding low dirt and sludge attraction during developing processes in photographic baths containing old chemicals from varying manufacturers, is a considerable improvement on DE-OS 37 00 183, and also offers good writability with lead pencil.

These objects are attained by a backside coating consisting of at least three components which include
 a terpolymer of styrene, butadiene and methacrylate,
 a compact (crystalline) silica with an average particle size of between 3 and 6 μm, and
 a colloidal aluminium modified silica.

A fourth component can be a water soluble salt of an organic polyacid, preferably a polysulfonic acid. The coating may also contain small amounts of further additive components, such as water soluble binding agents, hardening agents, wetting agents, coloring agents, etc. as long as these in no way affect the function of the coating.

The coating is formed by spreading an aqueous solution containing the necessary components onto the backside of the photographic support material and drying it. This may be carried out using any of the known coating methods whereby the concentration of the aqueous solution must be adjusted to suit the coating method used. Such coating methods may include an air doctor or air knife coating method, a squeeze coating method, a kiss coating method, a gravure coating method, a roll coating method, a spray coating method, etc.

According to the invention the aqueous solution contains the terpolymer in the form of a latex, and the colloidal aluminium modified silica in the form of a hydrosol. The compact silica is dispersed in water or, if necessary, in water which contains the salt of an organic polyacid.

The terpolymer latex as used in the invention should preferably have a solid content of between 30 and 50 wt. % The composition of the terpolymer has been chosen in order to achieve optimal printability and tape adhesion, while offering minimal tar stain and coloring of the backside coating. This is a most important part of the coating composition as it retains the balance between polar properties (necessary for tar stain reduction) and non-polar properties (necessary conditions for printability and tape adhesion). The preferred composition of the terpolymer according to the invention is within the following limits:
 55-70 wt. % of styrene
 25-40 wt. % of butadiene
 5-15 wt. % of methacrylate
and the preferred methacrylate is methyl- or ethylmethacrylate.

The quantity of terpolymer latex to be added to the aqueous solution should be sufficient so that the dried backside coating cannot be rubbed off during treatment in photographic baths. On the other hand, this quantity should be kept as low as possible so that the writability and, if necessary, the antistatic properties are not affected. This quantity is preferably between 10 and 30 wt. % of the total solution.

The compact silica (particle dimension 3-6 μm) is the ingredient responsible for the writability with lead pencil. Here, too, the quantity used can vary depending on the hardness of the pencil used, the quantities of the other components used, and the type of terpolymer applied in the backside coating. It is preferably between 0.1 and 3.0 wt. % of the total solution. An effect can be noted with a quantity as low as 0.1 wt. %. When this increases to more than 3 wt. %, the connection to the binding agent, the latex in this case, is weakened to such an extent that the overall effect is no longer totally satisfactory. If writability by lead pencil is not of primary importance, compact silica can be omitted without being detrimental to the other advantageous properties of the coating.

The aluminium modified colloidal silica sol in water, usually has a 30 wt. % solid content and binds itself during drying as a result of the condensation of hydroxyl groups. This binding increases printability of the backside and underlines the antistatic properties. The quantity used is preferably between 8 and 30 wt. % of the total solution.

Should an increase of antistatic properties be required, a fourth component comprising an aqueous solution of a salt of an organic polyacid, preferably a polysulfonic acid, may be added. A good to very good electrical surface conductivity, both before and after the bath processing, is achieved with this in combination with the aluminium modified colloidal silica.

A special effect of the terpolymer as used in the invention is the prevention of staining or discoloration of the dried backside coating caused by oxidation products of developer substances and washed out photosensitizers.

The solution, according to the invention, is spread on the plastic base material or plastic coated base paper in coating amounts of between 0.15 and 1.5 g/m² (after drying).

The enclosed Table 1 shows a comparison to various other backside coatings currently on the market. The coating according to the invention can be seen in the last vertical column. A universally applicable composition according to the invention could be as follows:

| | |
|---|---|
| Terpolymer latex of a styrene-butadiene-methacrylate, 50% in water, between | 10-30 wt. % |
| Compact silica (crystalline) 10% in water dispersed, between | 0.5-15 wt. % |
| Aluminium modified silica hydrosol (30 wt. % in water), between | 8-30 wt. % |
| Water soluble matal salt of a polysulfonic acid, 30% aqueous solution, between | 0.0-5 wt. % |
| and deionizd water in a quantity allowing a consistency enabling satisfactory spreading. A preferred coating composition (Example 1) is as follows: | |
| Deionized water | 58.0 wt. % |
| Terpolymer latex of a styrene:butadiene: methacrylate in the following ratios 55:35:10 (50 wt. %) | 20.0 wt. % |
| Compact silica, particle size 3-6 μm, 10% in water | 10.0 wt. % |
| Aluminium modified silica sol in water, 30% | 10.0 wt. % |
| Sodium salt of a polystyrene sulfonic acid, 30% aqueous solution | 2.0 wt. % |

TABLE 1

Test Results with Various Backside Coatings

|  |  | A | B | C | D | E | Invention Example |
|---|---|---|---|---|---|---|---|
| Print Quality after bath processing | Cherry ribbon | + | + | − | − | − | + |
|  | Pelikan ribbon | + | + | + | − | 0 | + |
|  | Kodak ribbon | ++ | ++ | 0 | − | − | ++ |
| Writability lead Pencil 3B |  | + | + | + | ++ | 0 | ++ |
| Writability lead pencil HB |  | − | − | − | ++ | − | + |
| Writability lead pencil 2H |  | − | − | − | − | − | 0 |
| Wet rub resistance |  | + | + | − | − | − | + |
| Tape adhesion |  | + | + | − | + | − | + |
| Dirt and sludge attraction ("tar stain") | Developer I | 0 to + | − | + | ++ | ++ | + |
|  | Developer II | − | − | + | + | + | + |
|  | Developer III | − | − | + | + | + | + |
| Coloration in baths |  | + | + | − | + | + | + |
| Electrical surface resistance before bath processing |  | + | ++ | ++ | 0 | + | ++ to + |
| Electrical surface resistance after bath processing |  | + | − | 0 | − | + | 0 to + |

Explanation of symbols in Table 1:
++: very good
+: good
0: satisfactory
−: poor
− −: very poor The backside coatings referred to with the letter A, B, C, D and E are:
A: Examples from DE 37 00 183
B: A Japanese trade product
C: An example from EU-OS 160 912
D: An American trade product
E: A European trade product.

FIG. 1 shows strips of photographic base papers with backside coatings after dirt attraction (tested in Developer II of Table 1), in which the subject of the invention is compared to the five backside coatings A-E. It can be seen that the product according to the invention prevents dirt and sludge attraction (tar stain) to its backside while product B especially, although a good product with regard to its other properties, shows a marked tendency to tar staining.

With regard to the tar stain, the products C, D and E are also good to very good. These three, however, leave something to be desired in the durability of print in the photographic baths (see Table 1) and C and E possess unacceptable properties of tape adhesion.

Table 2 shows the tape adhesion results achieved on the coatings reported in Table 1, and the measured results of surface resistance are also listed. Two variations of the invention having different conductivity values were chosen. The advantageous properties of these two products can be seen from the table.

The tests for antistatic properties were carried out by measuring surface resistance by electrode according to DIN 53482.

The tests for printability (print quality after baths) and rub resistance (print stability in and after baths) were carried out using examples of printing ribbons found on the market. In order to test the durability of print against chemical and mechanical stresses which may occur during developing processes, the printed examples were submerged in a developer (normal market product) for 30 seconds and a finger was wiped across them. A visual check was performed after the samples had been rinsed with water to see if any coloration or running of colors, as caused by the washing out of color components, was present. Thereafter the rub resistance of the print (or coating) was tested by heavily rubbing a finger across it.

In order to examine tape adhesive strength, a tape of normal trade quality was used (3M adhesive tape 8422). The tape was stuck to the backside coating using a pressure of 3 kg. Thereafter the examples, with tape adhering to them, were cut into strips of 1.5 cm width and placed in a tensile strength tester and the tape was pulled from the examples at angles of 180° and at a speed of 20 cm/min. The force needed to pull the tape from the samples was measured.

TABLE 2

Tape Adhesion and Measurements of the Electrical Surface Resistance

| Test Sample | Comparison | | | | | Invention | |
|---|---|---|---|---|---|---|---|
|  | A | B | C | D | E | Example 1 | Example 4 |
| Tape adhesion (N/15 mm) | 3.0 | 3.0 | 0.2 | 2.5 | 1.0 | 2.3 | 2.7 |
| Electrical surface resistance ($\Omega$/cm) |  |  |  |  |  |  |  |
| before baths | $3 \times 10^{10}$ | $2 \times 10^{9}$ | $7 \times 10^{9}$ | $3 \times 10^{11}$ | $6 \times 10^{10}$ | $6 \times 10^{9}$ | $2 \times 10^{10}$ |
| after baths | $7 \times 10^{10}$ | $4 \times 10^{12}$ | $8 \times 10^{11}$ | $2 \times 10^{13}$ | $7 \times 10^{10}$ | $6 \times 10^{11}$ | $5 \times 10^{10}$ |

In order to test tar stain capability, a colored developer of normal trade quality was poured into an open tray to a depth of approximately 2 cm and was left open to stand for one week. Upon completion of this time, a dark, tarlike layer of oxidation products had formed on the surface. The test samples, held in a slightly curved position, were drawn across this layer in order to create contact with the tar. Thereafter the samples were washed under running water and dried in the air. The samples were then visually judged, not only for their dirt and sludge attraction, but also for the coloration of the coating.

Table 3 contains Examples 2-6 of further compositions for backside coatings according to the invention. The details given in Table 3 are each in wt. %. The corresponding test results are contained in Table 4.

TABLE 3

| | \multicolumn{5}{c}{Examples} |
|---|---|---|---|---|---|
| | 2 | 3 | 4 | 5 | 6 |
| Compact silica, 3-6 μm, 10% in water | 8 | 5 | 2 | 10 | 10 |
| colloidal aluminium modified silica, 30% | 15 | 20 | 25 | 10 | 10 |
| Terpolymer 1 - Dispersion, 50% | 22 | 25 | 28 | — | — |
| Terpolymer 2 - Dispersion, 45% | — | — | — | 22 | — |
| Terpolymer 3 - Dispersion, 45% | — | — | — | — | 22 |
| Na-polystryene sulfonate, 30% | 3 | — | — | 2 | 2 |
| Na-polyvinyl sulfonate, 30% | — | 1 | — | — | — |
| Balance: water up to 100% | | | | | |

Terpolymer 1: Styrene:Butadiene:Methylmethacrylate = 55:35:10
Terpolymer 2: Styrene:Butadiene:Methylmethacrylate = 62:30:8
Terpolymer 3: Styrene:Butadiene:Alkylmethacrylate = 65:30:5

TABLE 4

| | \multicolumn{6}{c}{Test Results of the Examples} |
|---|---|---|---|---|---|---|
| | 1 | 2 | 3 | 4 | 5 | 6 |
| Print quality after baths | | | | | | |
| Ribbon 1 | good | good | good | good | good | good |
| Ribbon 2 | good | good | good | good | good | good |
| Ribbon 3 | very good | good | good | very good | very good | very good |
| Wet rub resistance of the print (1 to 3) | good | good | good | good | good | good |
| Writablity with lead pencil HB | good | good | not quite good | not quite good | good | good |
| Tape adhesion (N/15 mm) | — | 2.5 | 3.0 | 2.7 | 2.6 | 2.3 |
| Dirt or sludge atraction | | | | | | |
| Developer I | very low | very low | very low | very low | very low | very low |
| Developer II | very low | very low | very low | very low | very low | low |
| Coloration in baths | none | none | none | none | none | none |
| Electrical surface resistance: (Ohm/cm) | | | | | | |
| before baths | $6 \times 10^9$ | $3 \times 10^9$ | $5 \times 10^9$ | $3 \times 10^{10}$ | $7 \times 10^9$ | $8 \times 10^9$ |
| after baths | $6 \times 10^{11}$ | $3 \times 10^{11}$ | $9 \times 10^{10}$ | $5 \times 10^{10}$ | $1 \times 10^{11}$ | $3 \times 10^{11}$ |

We claim:

1. A photographic support material for light sensitive layers in the form of a plastic coated paper or plastic foil the backside of which has a further coating thereon, said further coating including a styrene-butadiene-methacrylate terpolymer and an aluminium modified colloidal silica.

2. The photographic support material of claim 1, wherein said further coating also includes a salt of an organic polyacid.

3. The photographic support material of claim 1, wherein said further coating also includes a compact silica with an average particle size of between about 3 and 6 μm.

4. The photographic support material of claim 2, wherein said further coating also includes a compact silica with an average particle size of between about 3 and 6 μm.

5. The photographic support material of claim 1, wherein said terpolymer comprises 55-70 wt. % styrene, 25-40 wt. % butadiene, and 5-15 wt. % methacrylate.

6. The photographic support material of claim 2 wherein said terpolymer comprises 55-70 wt. % styrene, 25-40 wt. % butadiene, and 5-15 wt. % methacrylate.

7. The photographic support material of claim 3 wherein said terpolymer comprises 55-70 wt. % styrene, 25-40 wt. % butadiene, and 5-15 wt. % methacrylate.

8. The photographic support material of claim 4 wherein said terpolymer comprises 55-70 wt. % styrene, 25-40 wt. % butadiene, and 5-15 wt. % methacrylate.

9. The photographic support material of claim 1, wherein said further coating is present in the amount of about 0.15-1.5 g/m².

10. The photographic support material of claim 2, wherein said further coating is present in the amount of about 0.15-1.5 g/m².

11. The photographic support material of claim 4, wherein said further coating is present in the amount of about 0.15-1.5 g/m².

12. The photographic support material of claim 8, wherein said further coating is present in the amount of about 0.15-1.5 g/m².

* * * * *

UNITED STATES PATENT AND TRADEMARK OFFICE
CERTIFICATE OF CORRECTION

PATENT NO. : 5,045,394

DATED : September 3, 1991

INVENTOR(S) : Eckehard Saverin and Hans-Udo Tyrakowski

It is certified that error appears in the above-identified patent and that said Letters Patent is hereby corrected as shown below:

In column 6, TABLE 2, penultimate line, under Example 4, delete "$2 \times 10^{10}$" and insert -- $3 \times 10^{10}$ --.

Signed and Sealed this

Twenty-second Day of December, 1992

Attest:

DOUGLAS B. COMER

*Attesting Officer*  *Acting Commissioner of Patents and Trademarks*